United States Patent

[11] 3,597,616

| [72] | Inventors | Donald C. Brunton;<br>Carl R. Soltesz, both of Columbus, Ohio |
|---|---|---|
| [21] | Appl. No. | 822,597 |
| [22] | Filed | May 7, 1969 |
| [45] | Patented | Aug. 3, 1971 |
| [73] | Assignee | Brun Sensor Systems, Inc.<br>Columbus, Ohio |

[54] INFRARED MEASUREMENT TECHNIQUE
8 Claims, 4 Drawing Figs.

[52] U.S. Cl. ............................................. 250/83.3 D,
250/43.5 D, 250/83.3 H
[51] Int. Cl. ............................................. G01t 1/16
[50] Field of Search ................................. 250/43.5,
83.3 H, 83.3 D

[56] References Cited
UNITED STATES PATENTS

| 3,207,901 | 9/1965 | Barker, Jr. | 250/83.3 |
| 3,228,282 | 1/1966 | Barker, Jr. | 250/83.3 X |
| 3,281,597 | 10/1966 | Greenberg | 250/83.3 X |
| 3,317,730 | 5/1967 | Hilsum | 250/43.5 X |

Primary Examiner—James W. Lawrence
Assistant Examiner—Davis L. Willis
Attorney—Mahoney, Miller & Stebens ABSTRACT: Measurement of moisture content or other property of a product or substance is accomplished through determination of the relative degree of transmission of two beams of radiation directed through a test quantity of the substance. The two beams of radiation are of wavelengths in the infrared spectrum with the specific wavelengths not selected on the basis of exhibiting characteristic absorption by the particular substance property to be determined but which wavelengths are selected on the basis that they exhibit a wavelength and property dependent scattering characteristic for this substance. Determination of the relative scattering of transmission of the two beams of radiation, one of which is of wavelength to exhibit less scattering at relatively lower percent inclusion of the particular property in a given mass of the substance, results in a ratio which is indicative of the included percentage of the property under test.

INVENTORS
DONALD C. BRUNTON
CARL R. SOLTESZ
BY MAHONEY, MILLER & RAMBO
BY Wm. V. Miller
ATTORNEYS

INFRARED MEASUREMENT TECHNIQUE

GENERAL DESCRIPTION

Measurement techniques of either the transmission or reflection-type employing radiation within the infrared spectrum have been previously utilized in determining moisture or other property of a substance or product. In general, the known prior art test apparatus and methods utilize infrared radiation in two beams which are directed through a test quantity of the substance with the transmitted radiation detected by suitably responsive sensors and their outputs analyzed to provide an indication of the property. In this description of the prior art and of the present invention, the terminology "transmitted radiation" is applicable to either transmission- or reflection-type measurement techniques and "transmitted" refers to that radiation which, having been directed into the substance at a surface, subsequently exits the substance at the same or the opposite surface where it is detected by a sensor. The two beams of radiation are of different wavelengths which are selected on the basis that one wavelength, the reference wavelength, is relatively unaffected by the property under test while the other wavelength exhibits a relatively high absorption characteristic as to this property. Comparison of the degree of radiation transmission, a ratio determination, provides an indication of the percentage of the property. This prior art method and apparatus is exemplified by U.S. Pat. Nos. 3,228,282 and 3,017,512 which illustrate transmission and reflection-type measurement techniques, respectively; however, the apparatus and method has not been effective in testing of all substances and has been particularly ineffective in testing of certain cereal-type food products.

In accordance with this invention, testing of these food products is accomplished by an infrared measurement technique of either the transmission or reflection type utilizing apparatus providing a ratio determination of two transmitted beams of radiation. In this technique, the two radiation beams are of wavelengths within the infrared spectrum, but neither beam is of a wavelength selected to exhibit resonance absorption characteristic as in the prior art. Instead the radiation wavelengths which are within a relatively narrow spectrum are selected to exhibit different response characteristics with respect to the radiation-scattering effect of the particular property. Since there will be a resultant difference in the radiation transmitted as between the two beams, a ratio determination can be made which will indicate the percent or amount of the property under test.

These and other features and advantages of this invention will be readily apparent from the following detailed description of an embodiment of the apparatus and application of the method and from the accompanying drawings.

Figure 1:
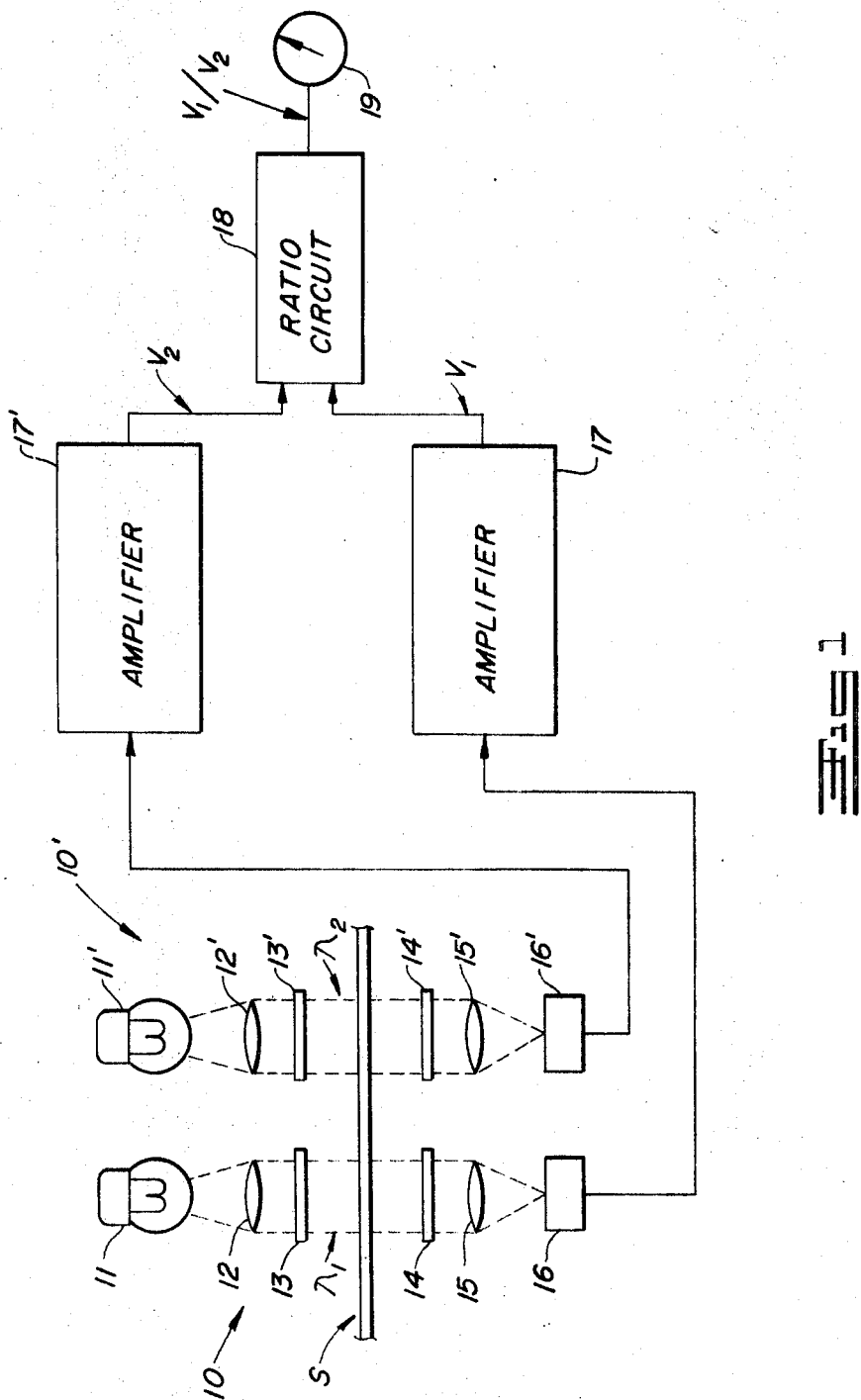
FIG. 1 is a diagrammatic illustration of a test apparatus for effecting a transmission-type infrared measurement in accordance with this invention.

Having reference to the drawings, specifically FIG. 1, apparatus for effecting a dual-measurement, infrared transmission-type test in accordance with the invention is diagrammatically illustrated and is seen to comprise a source of radiant energy in the infrared spectrum and radiation detection means responsive to the energy source radiation. The test apparatus is arranged to effect transmission of the source radiation through a quantity of substance which is to be tested and to subsequently detect the radiation thus transmitted for generation of an electrical output signal for each beam of radiation in forming an indication of the percent of the particular property. Apparatus for effecting a dual infrared transmission measurement is exemplified in the previously cited U.S. Pat. No. 3,228,282; however, the measurement technique of this invention is distinguishable. The present measurement technique, while being of a dual measurement transmission type as is the prior art, is distinguishable in that neither beam of essentially monochromatic radiation is of a wavelength selected to exhibit a characteristic absorption with respect to the particular property of the substance under test.

Although the apparatus illustrated in FIG. 1 is of a configuration designed for a transmission-type test, it is to be understood that the testing technique of this invention is equally applicable to a reflection-type test. U.S. Pat. No. 3,017,512 discloses measurement apparatus for reflection-type testing and that apparatus can also be readily adapted to utilization of the testing technique of this invention. Accordingly, while the following detailed description is directed to a test apparatus of the transmission type where radiation is transmitted through the test substance and exits at a surface opposite the entrance surface, it will be seen that the terminology "transmitted radiation" is also applicable to transmission of radiation in a reflection-type measurement where the radiation exits the substance at the same surface of the substance as it entered. In this instance, the radiation is also "transmitted" through the substance, although by a different path, and the terminology "transmitted radiation" is equally appropriate and no limitation of this invention to transmission-type testing is intended by use of this language in the specification or the claims.

The apparatus illustrated in FIG. 1 for practice of the measurement technique of this invention includes two similar radiation detector units 10, 10' which are appropriately positioned to a test quantity of the substances, designated by the letter S, to effect transmission of energy source radiation through the substance. For illustrative purposes, the substance S is represented as a planar sheet of finite thickness with the thickness being of a magnitude that permits effective transmission of the radiation. Although illustrated as a structurally integral sheet, the substance S may be in granular or particle form or a liquid supported in a test cell or particles in a liquid or a gas and the measurement technique of this invention utilized to equal advantage in continuously monitoring or periodically determining the percent of a particular property in the substance.

Each detector unit 10, 10' comprises a radiant energy source 11, 11', a collimating lens system 12, 12', a radiation filter system which may include tow band-pass filter elements 13, 13' and 14, 14' disposed at opposite sides of the test substance S, or which may include only one band-pass filter element such as 13, 13', a focusing lens system 15, 15' and respective radiation responsive sensors 16, 16' in optically coupled relationship to respond to incident radiation transmitted through the substance. The radiant energy sources 11, 11', which may be incandescent lamps, are preferably of a type having a relatively high emission characteristic as to the infrared spectrum and particularly as to the selected wavelengths. Radiation emitted by the respective sources 11, 11' is initially collimated by the lens systems 12, 12' to form beams of radiation directed through the substance S for subsequent imaging by the focusing lens systems 15, 15' on a radiation receptor surface of a respective sensor 16, 16'. Sets of band-pass filter elements 13, 14 and 13', 14' are designed to only transmit radiation of wavelengths within a relatively narrow spectral band thus providing respective beams of monochromatic radiation of selected wavelengths $\lambda_1$ and $\lambda_2$. These selected wavelengths $\lambda_1$ and $\lambda_2$ are within the infrared spectrum and the radiation sensors 16, 16' are of a type exhibiting an appropriate response characteristic at the respective wavelength. For example, the sensors may be photoconductive or photovoltaic cells or devices producing a voltage output signal in response to incident radiation and indicative of the transmitted radiation.

Connected to the output of each sensor 16, 16' is a respective electronic amplifier circuit 17, 17' which, in the case of the photovoltaic cell-type devices, receive and amplify the sensor output voltage signal to a useable level at their respective outputs with the amplified output signal voltages designated as $V_1$ and $V_2$. Connected in turn to the output of each of amplifier circuit 17, 17' to receive the respective output voltage signals $V_1$ and $V_2$ is a ratio analyzer circuits 18 which forms a resultant output signal that is the ratio $V_1/V_2$ of these two voltage signals and consequently a ratio of the transmitted radiation. A suitable readout device such as an indicating meter may be connected to the output of the ratio analyzer circuit 18 to provide a visual indication or the ratio signal may be directly utilized in a control function. The specific circuitry of the amplifiers 17, 17' and ratio analyzer circuit 18 is well known and is not further illustrated or described other than to note that the circuitry would be appropriate for the particular application.

The described apparatus for effecting an infrared measurement utilizes spatially separated or independent monochromatic beams of radiation having respective independent sources and sensors. This is not to be considered as a limitation on the practice of the present invention technique as the beams may, instead, be separated in time thus permitting utilization of a single radiation source and sensor. Apparatus for effecting such a time separation of the two beams of radiation in performance of infrared measurements is illustrated in U.S. Pat. No. 3,089,382 and it will be apparent that the apparatus of this patent may also be utilized in the practice of the infrared measurement technique of this invention.

Figure 2:
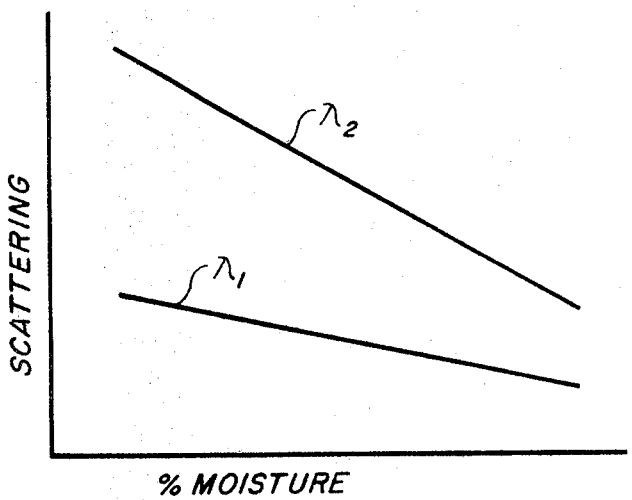
FIGS. 2 and 3 are graphical representations of the radiation scattering and transmitting characteristics of a substance with respect to a particular property for two distinct radiation wavelengths.
Figure 3:
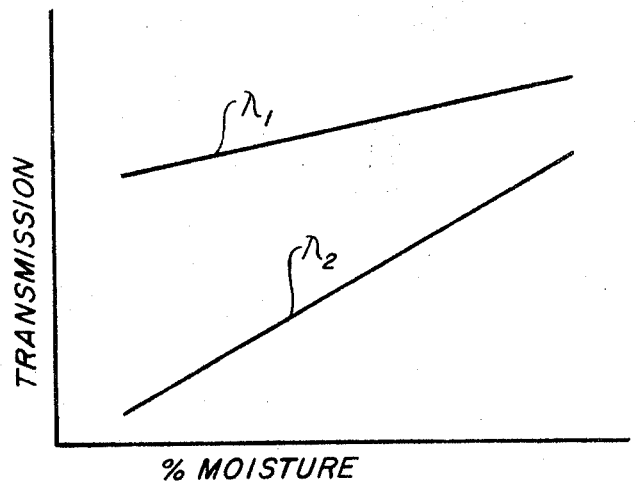

As previously indicated, the two beams of radiation directed through the substance S are essentially monochromatic beams of the selected wavelengths $\lambda_1$ and $\lambda_2$, neither of which exhibits a particular absorption characteristic as to a particular property of the substance under test. In the case of cereal-type food products where the property of interest is the moisture content it has been observed that the scattering of infrared radiation varies considerably as a function of the wavelength and that the scattering is further dependent on the relative moisture content. This effect has been observed in particular with respect to wheat and corn cereal products with the selected radiation wavelengths being in the one-three micron spectral band. FIG. 2 graphically illustrates this radiation-scattering characteristic as a function of moisture content for the selected wavelengths $\lambda_1$ and $\lambda_2$ with the wavelength $\lambda_2$ designated as the reference wavelength to show substantially more scattering at a low-moisture content. The degree of scattering decreases with increasing moisture content with the two characteristics being relatively convergent. The radiation transmission characteristics as shown in FIG. 3 will have a positive slope indicating increasing transmission with the increasing moisture content and the characteristics will also be convergent.

Figure 4:
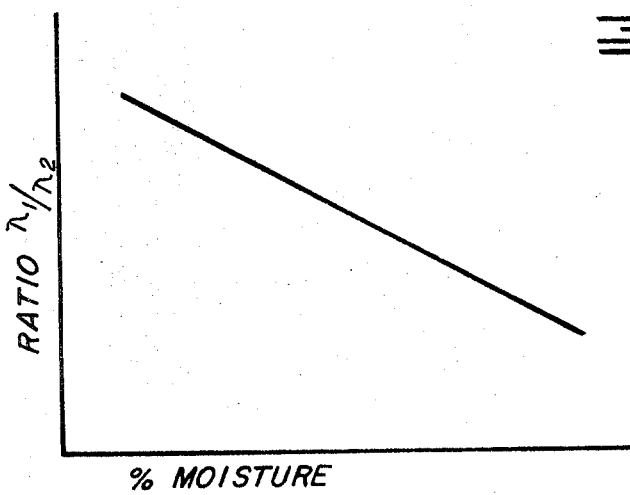
FIG. 4 is a graphical representation of the ratio of the transmitted radiation with respect to the particular property for the two wavelengths.

This difference in the slopes of the transmission characteristics for the two wavelengths $\lambda_1$ and $\lambda_2$ provides means for comparison as a function of the property under test, moisture content in this example, and this difference can be graphically represented as a ratio as sown in FIG. 4. The difference between the two wavelength characteristics ($\lambda_1$ and $\lambda_2$) or the ratio of $\lambda_1/\lambda_2$ decreases with increasing moisture content resulting in the negative slope characteristic for the ratio $\lambda_1 1\lambda_2$. Determination of this ratio of transmitted radiation in two discrete wavelength beams for a specific substance sample thus provides an indication of the moisture content. Utilization of the diagrammatically illustrated apparatus of FIG. 1 electronically determines the ratio of the two transmitted beams of radiation and provide the percent moisture indication.

While the measurement of percent moisture has been described in relation to straight line or linear characteristics, it will be understood that the illustrated graphical representations are exemplary and that the characteristics may be nonlinear and that the slopes may be other than that illustrated. The characteristics for a specific substance will be a function of the wavelength and particular property under test and the property under test may be something other than moisture. In any instance, the transmitted beams of infrared radiation are of wavelengths selected to not exhibit a characteristic absorption as to the particular property under test, but which do exhibit differing degrees of radiation scattering as to this property. Also, the direct ratio measurement $\lambda_1 1\lambda_2$ described may be omitted in favor of other mathematical combinations of the two voltage signals $V_1$ and $V_2$ to provide a ratio measurement. For example, mathematical combinations through employment of appropriate electronic circuitry such as $(\lambda_1-\lambda_2)/\lambda_2$, $(\lambda_1-\lambda_2)/(\lambda_1+\lambda_2)$ and $\lambda_1/\lambda^2_2$ have been considered and are within the scope of this invention. These ratios have been expressed in terms of wavelength in this description but it will be understood that these are ratios of the respective voltage signals $V_1$ and $V_2$.

The dual beam, infrared measurement technique of this invention, whether of the transmission or reflection type, permits the advantageous measurement of a particular substance property with respect to certain substances which was not possible with prior art infrared measurement techniques. Transmission of two beams of monochromatic radiation in THE infrared spectrum through the substance with neither of the respective wavelengths selected as exhibiting a characteristic absorption but which exhibit different radiation-scattering characteristics results in formation of respect voltage signals due to the operation of the radiation sensors. The associated electronic circuitry forms a resultant output signal which is a ratio of these two signals related to the magnitude of the transmitting radiation at the two wavelengths and is na indication of the percent of the particular property of the substance under test.

Having thus described this invention, what we claim is:

1. Apparatus for determining the present or the amount of a property in a substance comprising:
    A. radiation source means emitting waveform radiation of discrete wavelengths $\lambda_1$ and $\lambda_2$ within the infrared spectrum with said wavelengths $\lambda_1$ and $\lambda_2$ selected to exhibit characteristic scattering by the substance as a function of the property with radiation of wavelength $\lambda_2$ exhibiting a relatively greater degree of scattering than radiation of wavelength $\lambda_1$,
    B. means optically coupled with said radiation source means for forming two beams of radiation of respective wavelengths $\lambda_1$ and $\lambda_2$ and directing said formed beams through the substance, and
    C. radiation detection means disposed in optically coupled relationship with said beams of radiation transmitted through the substance and independently responsive to each respective beam in forming output signals related to the magnitude of the transmitted beams of radiation with the ratio of said output signals providing an indication of the percent of the property in the substance.

2. Apparatus according to claim 1 wherein said radiation source means emits radiation of wavelengths in the one-three micron spectral band.

3. Apparatus according to claim 1 wherein said radiation detection means includes radiation-sensing means responsive to said transmitted radiation and forming respective voltage output signals for each of said radiation wavelengths.

4. Apparatus according to claim 3 wherein said radiation detection means includes circuit means forming an output which is a ratio of said voltage output signals.

5. The method of determining the relative content of a property in a substance comprising the steps of
    A. generating radiation of two discrete wavelengths within the infrared spectrum each of which wavelengths is selected to exhibit characteristic scattering by the substance as a function of the property with the radiation of one of said wavelengths exhibiting a relatively greater degree of scattering, neither of said radiation wavelengths selected to exhibit resonance absorption as to the property with the relative degree of scattering of said wavelengths decreasing with an increase in the relative property content, B. directing said radiation through the substance,
C. detecting the radiation transmitted through the test substance with means generating respective signals related to the magnitude of the respective radiation wavelengths transmitted and,
D. determining the ratio of said signals as indicative of the property content of the substance.

6. The method of claim 5 wherein said radiation wavelengths are within the one-three micron spectral band.

7. The method of claim 5 wherein the ratio of said signals is determined as a direct relationship of the wavelength exhibiting the greater scattering to the other wavelength.

8. The method of claim 5 wherein said radiation is formed in two relatively monochromatic beams of the respective wavelengths and directed through the substance.